United States Patent
Wang

(10) Patent No.: US 6,711,635 B1
(45) Date of Patent: Mar. 23, 2004

(54) DISK DRIVE EMPLOYING THRESHOLDS FOR CACHE MEMORY ALLOCATION

(75) Inventor: Ming Y. Wang, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 16 days.

(21) Appl. No.: 10/262,014

(22) Filed: Sep. 30, 2002

(51) Int. Cl.[7] .................................................. G06F 3/00
(52) U.S. Cl. ............................ 710/56; 710/52; 711/129
(58) Field of Search ..................... 710/56, 52; 711/113, 711/110, 118, 129

(56) References Cited

U.S. PATENT DOCUMENTS

| | | | |
|---|---|---|---|
| 4,489,378 A | 12/1984 | Dixon et al. .................. 710/33 |
| 5,890,211 A | 3/1999 | Sokolov et al. ............. 711/113 |
| 5,966,726 A | 10/1999 | Sokolov ...................... 711/113 |
| 6,349,363 B2 * | 2/2002 | Cai et al. .................... 711/129 |
| 6,434,663 B1 * | 8/2002 | Grimsrud et al. ........... 711/111 |
| 6,470,422 B2 * | 10/2002 | Cai et al. .................... 711/129 |
| 6,480,936 B1 * | 11/2002 | Ban et al. ................... 711/118 |
| 6,532,513 B1 * | 3/2003 | Yamamoto et al. ......... 711/100 |
| 6,578,107 B1 * | 6/2003 | Anderson et al. ........... 711/113 |

* cited by examiner

Primary Examiner—Jeffrey Gaffin
Assistant Examiner—Harold Kim
(74) Attorney, Agent, or Firm—Milad G. Shara, Esq.; Howard H. Sheerin, Esq.

(57) ABSTRACT

A disk drive is disclosed comprising a disk having a plurality of tracks, each track comprising a plurality of blocks. A semiconductor memory comprises a cache buffer having a plurality of segment pools, each segment pool comprising a plurality of cache segments, each cache segment comprises at least one block, and the number of blocks in each cache segment varies between segment pools. When a host command is received, the command size is compared to a threshold in order to allocate a cache segment from a first segment pool or a second segment pool.

18 Claims, 10 Drawing Sheets

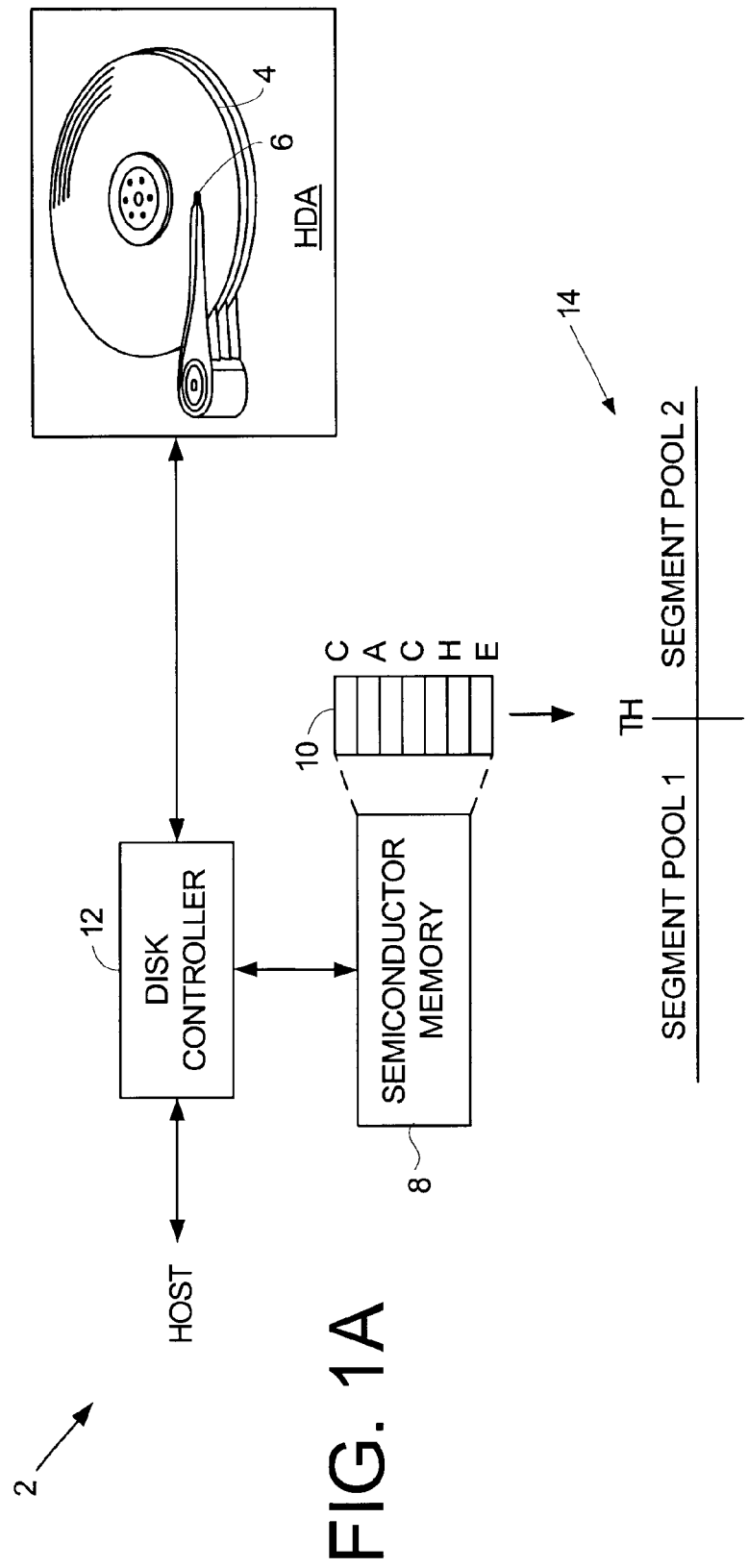

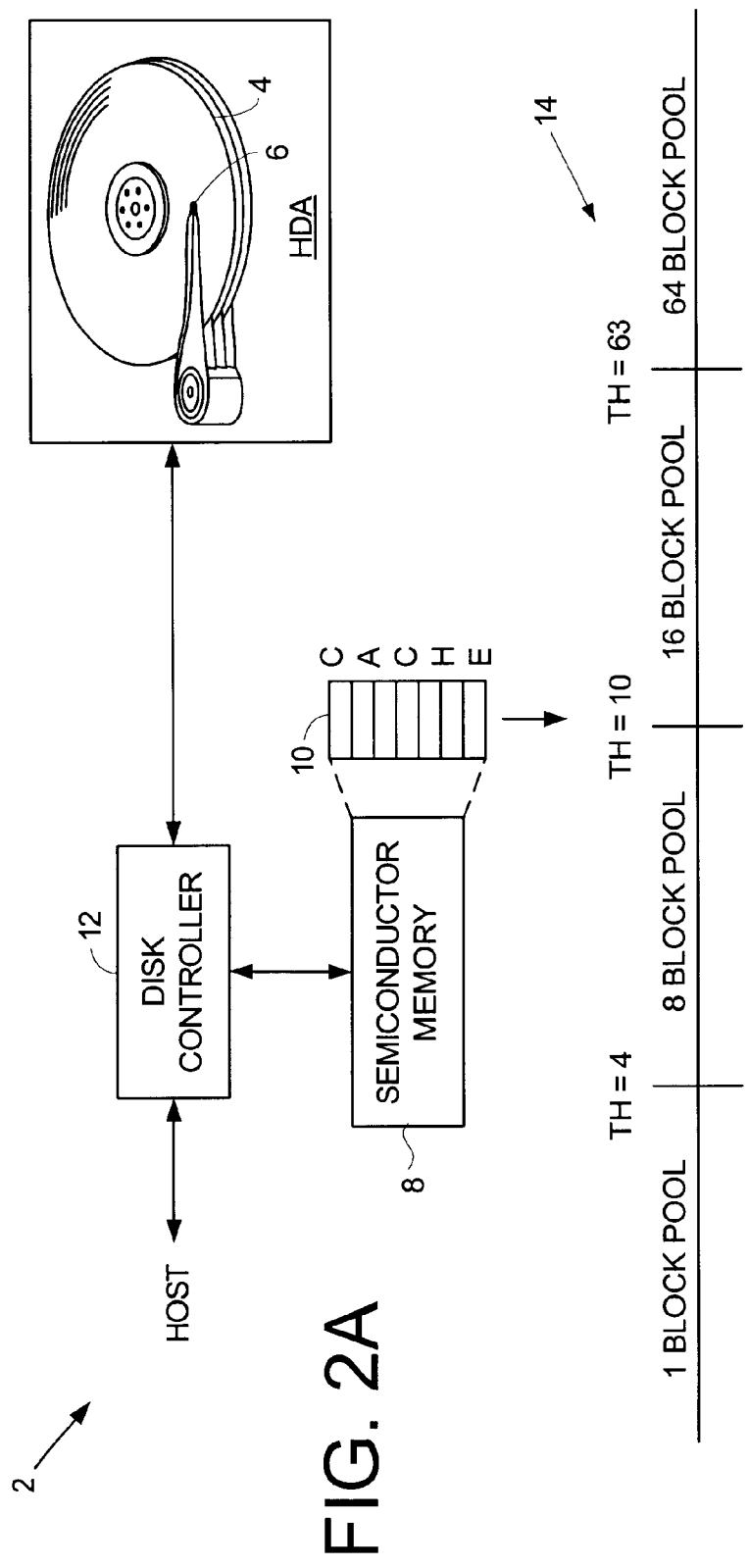

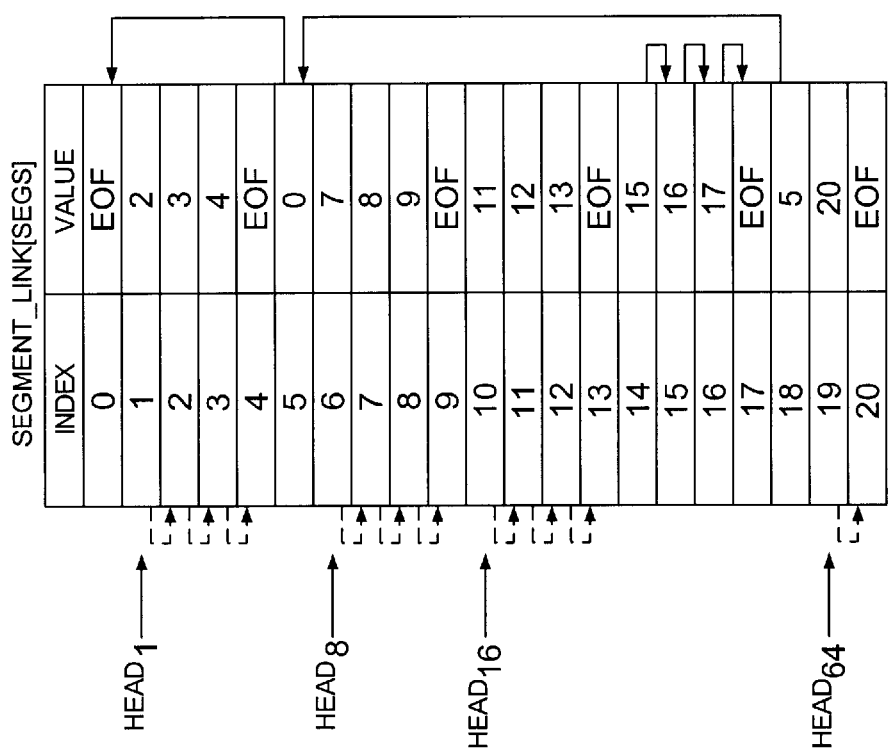

DISK DRIVE EMPLOYING THRESHOLDS FOR CACHE MEMORY ALLOCATION

CROSS REFERENCE TO RELATED APPLICATIONS AND PATENTS

This application is related to co-pending U.S. Patent Application Ser. No. 10/262,469 entitled "DISK DRIVE ADJUSTING READ-AHEAD TO OPTIMIZE CACHE MEMORY ALLOCATION" filed on Sep. 3, 2002, the disclosure of which is incorporated herein by reference.

BACKGROUND OF THE INVENTION

1. Field of the Invention

The present invention relates to disk drives for computer systems. More particularly, the present invention relates to a disk drive employing thresholds for cache memory allocation.

2. Description of the Prior Art

A disk drive typically comprises a cache memory for caching data written to the disk as well as data read from the disk. The overall performance of the disk drive is affected by how efficiently the cache memory can be allocated for a host command. In the past, the cache memory has been divided into cache segments each comprising a number of blocks (e.g., eight blocks), wherein the cache system would allocate a number of cache segments to process the host command. This technique is inefficient, however, if the number of blocks in a cache segment does not integer divide into the number of blocks associated with processing the host command leaving part of a cache segment allocated but unused.

SUMMARY OF THE INVENTION

The present invention may be regarded as a disk drive comprising a disk comprising a plurality of tracks, each track comprising a plurality of blocks. A head is actuated radially over the disk, and a semiconductor memory comprising a cache buffer caches data written to the disk and data read from the disk. The cache buffer comprises a plurality of segment pools, wherein each segment pool comprises a plurality of cache segments, each cache segment comprises at least one block, and the number of blocks in each cache segment varies between segment pools. A threshold is associated with a first one of the segment pools and a second one of the segment pools, wherein the threshold is greater than a size of the cache segments in the first segment pool and less than a size of the cache segments in the second segment pool. The disk drive receives a host command from a host computer, the host command comprising a command size indicating a number of blocks associated with the host command. A factor of the command size is compared to the threshold in order to allocate a cache segment from either the first segment pool or the second segment pool.

In one embodiment, a cache segment from the second segment pool is allocated if the factor of the command size is greater than the threshold. If the second segment pool is empty, in one embodiment a plurality of cache segments are allocated from the first segment pool.

In another embodiment, a cache segment from the first segment pool is allocated if the factor of the command size is less than the threshold. If the first segment pool is empty, in one embodiment a cache segment is allocated from the second segment pool.

In one embodiment, each cache segment comprises $2^k$ number of blocks where k is a predetermined integer for each segment pool. For example, in one embodiment the segment pools comprise a one-block segment pool, an eight-block segment pool, a sixteen-block segment pool, and a sixty-four-block segment pool. A first factor of the command size is compared to a first threshold in order to allocate a cache segment from the one-block segment pool or the eight-block segment pool. A second factor of the command size is compared to a second threshold in order to allocate a cache segment from the eight-block segment pool or the sixteen-block segment pool. And a third factor of the command size is compared to a third threshold in order to allocate a cache segment from the sixteen-block segment pool or the sixty-four-block segment pool. In one embodiment, the first threshold is four, the second threshold is ten, and the third threshold is sixty-three.

In yet another embodiment, the threshold is adjusted relative to an allocation status of each cache segment in the segment pools. For example, the threshold is reduced if the number of free cache segments in the first segment pool falls below a predetermined threshold.

The present invention may also be regarded as a method of writing data through a head actuated radially over a disk in a disk drive. The disk comprises a plurality of tracks, each track comprising a plurality of blocks. The disk drive comprises a semiconductor memory having a cache buffer for caching data written to the disk and data read from the disk, the cache buffer comprising a plurality of segment pools, each segment pool comprising a plurality of cache segments, each cache segment comprises at least one block, and the number of blocks in each cache segment varies between segment pools. A threshold is associated with a first one of the segment pools and a second one of the segment pools, wherein the threshold is greater than a size of the cache segments in the first segment pool and less than a size of the cache segments in the second segment pool. A host command is received from a host computer, wherein the host command comprises a command size indicating a number of blocks associated with the host command. A factor of the command size is compared to the threshold in order to allocate a cache segment from either the first segment pool or the second segment pool.

BRIEF DESCRIPTION OF THE DRAWINGS

FIG. 1A shows a disk drive according to an embodiment of the present invention comprising a disk, a head actuated radially over the disk, a disk controller, and a semiconductor memory comprising a cache buffer for storing data in a plurality of segment pools of various sizes.

FIG. 1B shows an embodiment of the present invention wherein a factor of a command size is compared to a threshold in order to allocate a cache segment from a selected segment pool.

FIGS. 2A–2B show an embodiment of the present invention wherein the segment pools comprise a one-block segment pool, an eight-block segment pool, a sixteen-block segment pool, and a sixty-four-segment pool, wherein thresholds of four, ten, and sixty-three are used to allocate cache segments from each segment pool.

FIGS. 7A–7B illustrate how the SEGMENT_LINK and FREE_SEG_LIST data structures are updated after allocating 1 sixty-four-block cache segment, 1 eight-block cache segment, and 1 one-block cache segment for a write command.

DESCRIPTION OF THE PREFERRED EMBODIMENTS

Figure 3A:
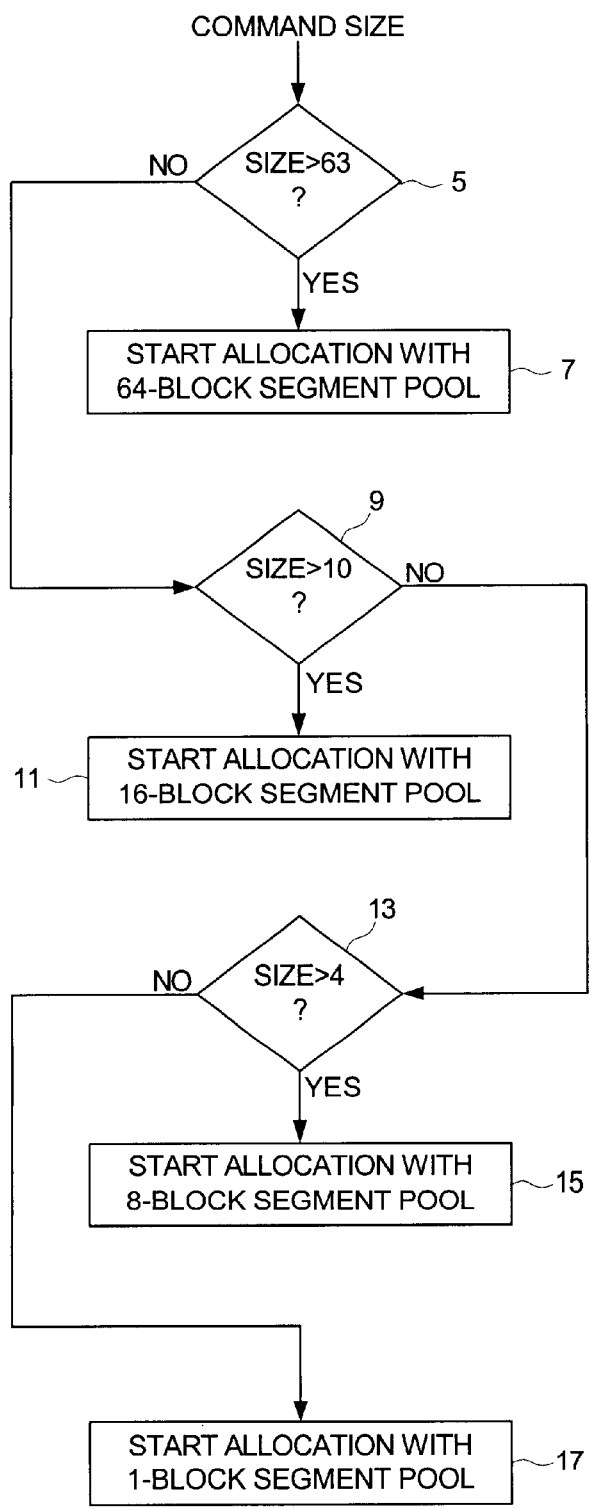
FIG. 3A shows a flow diagram according to an embodiment of the present invention wherein a command size is compared to the thresholds to determine a starting point for the allocation algorithm.

FIG. 1A shows a disk drive 2 comprising a disk 4 having a plurality of tracks, each track comprising a plurality of blocks. A head 6 is actuated radially over the disk 4, and a semiconductor memory 8 comprising a cache buffer 10 caches data written to the disk and data read from the disk 4. The cache buffer 10 comprises a plurality of segment pools 14, wherein each segment pool comprises a plurality of cache segments, each cache segment comprises at least one block, and the number of blocks in each cache segment varies between segment pools. A threshold TH is associated with a first one of the segment pools and a second one of the segment pools, wherein the threshold TH is greater than a size of the cache segments in the first segment pool and less than a size of the cache segments in the second segment pool. The disk drive 2 receives a host command from a host computer, the host command comprising a command size indicating a number of blocks associated with the host command. A factor of the command size is compared to the threshold TH in order to allocate a cache segment from either the first segment pool or the second segment pool.

Any suitable block size may be employed in the embodiments of the present invention, including the 512 byte block employed in a conventional IDE disk drive, the 1024 byte block employed in a conventional SCSI disk drive, or any other block size depending on the design requirements.

FIGS. 2A–2B show a disk drive according to an embodiment of the present invention wherein the cache buffer 10 comprises four segment pools, each comprising $2^k$ number of blocks: a one-block segment pool, an eight-block segment pool, a sixteen-block segment pool, and a sixty-four-block segment pool. A threshold of four is used to select between the one-block cache segments and the eight-block cache segments, a threshold of ten is used to select between the eight-block cache segments and the sixteen-block cache segments, and a threshold of sixty-three is used to select between the sixteen-block cache segments and the sixty-four-block cache segments. In one embodiment, memory for read commands are always allocated from the sixty-four-block cache segments by adjusting the amount of read-ahead blocks so that the amount of read data is integer divisible by sixty-four. Details of this embodiment are disclosed in the above-referenced co-pending patent application entitled "DISK DRIVE ADJUSTING READ-AHEAD TO OPTIMIZE CACHE MEMORY ALLOCATION".

The variable sized cached segments in each of the segment pools together with the thresholds facilitate memory allocation for host commands using a "loose-fit" allocation algorithm. FIG. 3A shows a flow diagram according to an embodiment of the present invention wherein the command size of a host command is compared to the thresholds in order to determine the largest cache segment to begin the allocation algorithm. If at step 5 the command size is greater than the threshold 63, then at step 7 the allocation algorithm starts allocating from the sixty-four-block segment pool. Otherwise if at step 9 the command size is greater than the threshold 10, then at step 11 the allocation algorithm starts allocating from the sixteen-block segment pool. Otherwise if at step 13 the command size is greater than the threshold 4, then at step 15 the allocation algorithm starts allocating from the eight-block segment pool, else at step 17 the allocation algorithm starts allocating from the one-block segment pool.

Figure 3B:
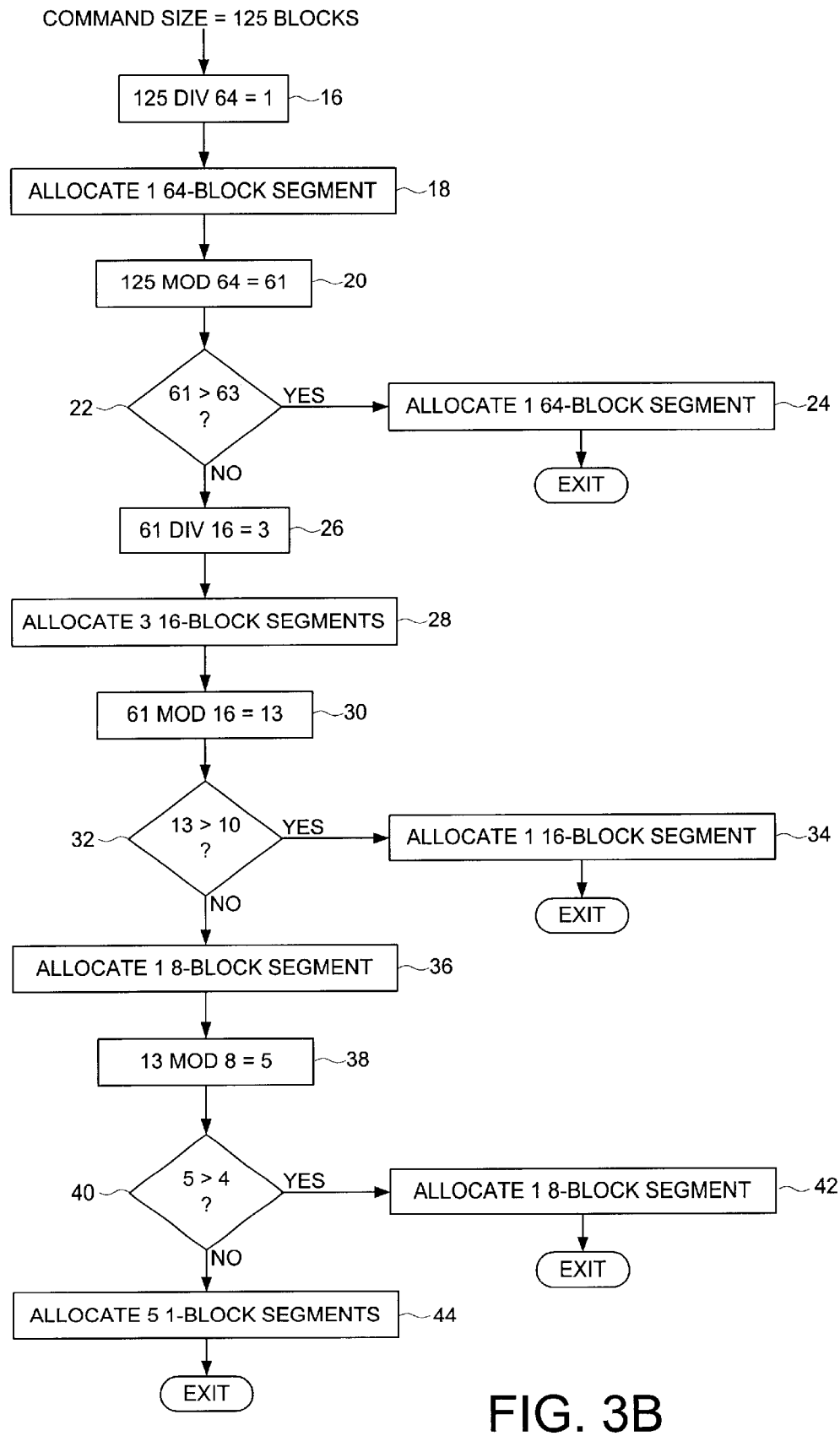
FIG. 3B shows a flow diagram according to an embodiment of the present invention for allocating cache segments for a command size of 125 blocks.

FIG. 3B shows a flow diagram according to an embodiment of the present invention for allocating cache segments for a command size of 125 blocks. At step 16 the command size of 125 is integer divided by the cache segment size 64 with a result of one. At step 18 one sixty-four-block cache segment is allocated. At step 20 the modulus division of 125 by 64 is computed to generate a result of 61. If at step 22 the result of 61 is greater than the threshold 63, then at step 24 an additional sixty-four-block cache segment is allocated and the procedure exits. Otherwise at step 26 the result of 61 is integer divided by the cache segment size 16 with a result of three. At step 28 three sixteen-block cache segments are allocated. At step 30 the modulus division of 61 by 18 is computed to generate a result of 13. If at step 32 the result of 13 is greater than the threshold 10, then at step 34 an additional sixteen-block cache segment is allocated and the procedure exits. Otherwise at step 36 one eight-block cache segment is allocated and at step 38 the modulus division of 13 by 8 is computed to generate a result of 5. If at step 40 the result 5 is greater than the threshold 4, then at step 42 an additional eight-block cache segment is allocated and the procedure exits. Otherwise at step 44 five one-block cache segments are allocated and the procedure exits.

Allocating cache segments relative to thresholds to implement a "loose-fit" algorithm helps optimize memory allocation. For example, since there are a limited number of one-block cache segments, it may be better to allocate an eight-block cache segment rather than five one-block cache segments even though four blocks of the eight-block cache segment are unused. Conversely, it may be better to allocate four one-block cache segments rather than one eight-block cache segment to avoid leaving five blocks of the eight-block cache segment unused.

In one embodiment, if the loose-fit algorithm indicates a cache segment should be allocated from a first segment pool but the segment pool is empty, then memory is allocated from another segment pool. Referring again to FIG. 2B, if the algorithm attempts to allocate a sixteen-block cache segment to fulfill a host command but the sixteen-block segment pool is empty, the algorithm allocates two eight-block cache segments to fulfill the request. Similarly, if the algorithm attempts to allocate an eight-block cache segment but the eight-block segment pool is empty, the algorithm allocates a sixteen-block cache segment to fulfill the request. In one embodiment, the disk controller 12 evaluates the number of free cache segments in adjacent segment pools to make the appropriate substitution. For example, if a sixteen-block cache segment is needed but the sixteen-block segment pool is empty, the disk controller will evaluate the number of free cache segments in the eight-block segment pool and the sixty-four-block segment pool. If the number of cache segments in the eight-block segment pool is low, the disk controller will allocate a sixty-four-block cache segment from the sixty-four-block segment pool.

Figure 4:
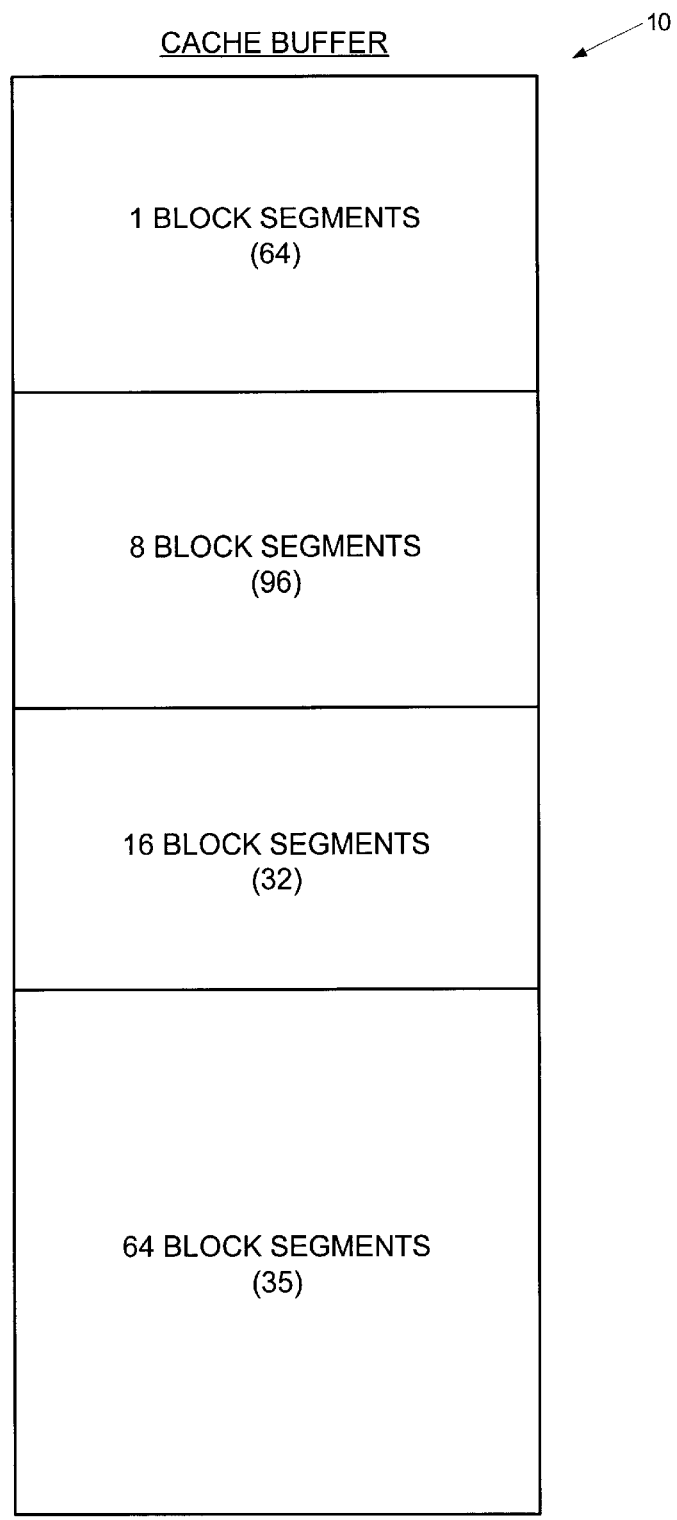
FIG. 4 shows an embodiment of the present invention wherein the cache buffer comprises a plurality of segment pools, each segment pool comprises a plurality of cache segments, and each cache segment comprises $2^k$ number of blocks where k is a predetermined value for each segment pool.

FIG. 4 shows an embodiment of the present invention wherein the cache buffer 10 comprises 64 one-block cache segments, 96 eight-block cache segments, 32 sixteen-block cache segments, and 35 sixty-four-block cache segments. Any suitable number of cache segments may be employed within each segment pool. In addition, any suitable number of segment pools having cache segments comprising a variable number of blocks may be employed.

Figures 5A, 5B:
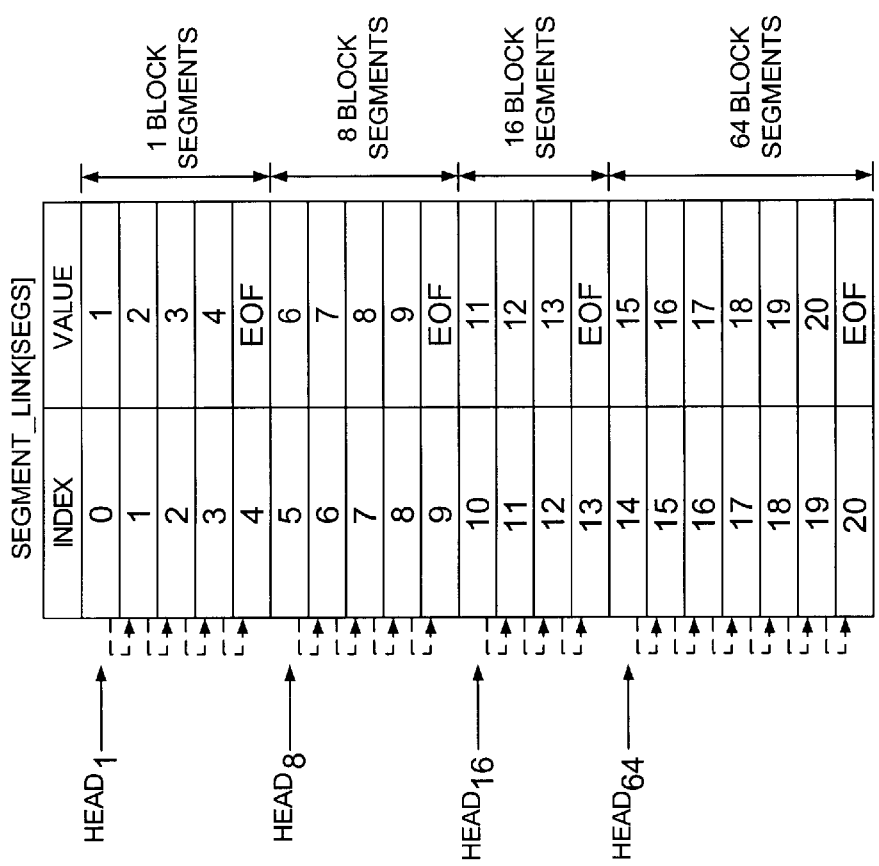
FIG. 5A show an embodiment of the present invention wherein a SEGMENT_LINK data structure maintains a linked list of cache segments for respective read and write commands.
FIG. 5B shows an embodiment of the present invention wherein a FREE_SEG_LIST data structure maintains a head pointer and count for the free cache segments in each segment pool of FIG. 4.

FIG. 5A show an embodiment of the present invention wherein a SEGMENT_LINK data structure maintains a linked list of cache segments for respective read and write commands. The INDEX field identifies the segment number within the cache buffer 10, and the VALUE field points to the next cache segment within the link. The SEGMENT_LINK data structure is initialized so that the cache segments are linked together within each segment pool as illustrated in FIG. 5A. FIG. 5B shows a FREE_SEG_LIST data structure which maintains a HEAD pointer into each segment pool and COUNT field which identifies the number of free cache segments within each segment pool. The INDEX field of the FREE_SEG_LIST data structure corresponds to the segment pool size (i.e., $2^k$ number of blocks). In this example, the cache buffer 10 comprises 5 one-block cache segments, 5 eight-block cache segments, 4 sixteen-block cache segments, and 7 sixty-four-block cache segments. The HEAD pointer is initialized to the first cache segment of each segment pool as illustrated in FIG. 5A and 5B.

Figures 6A, 6B:
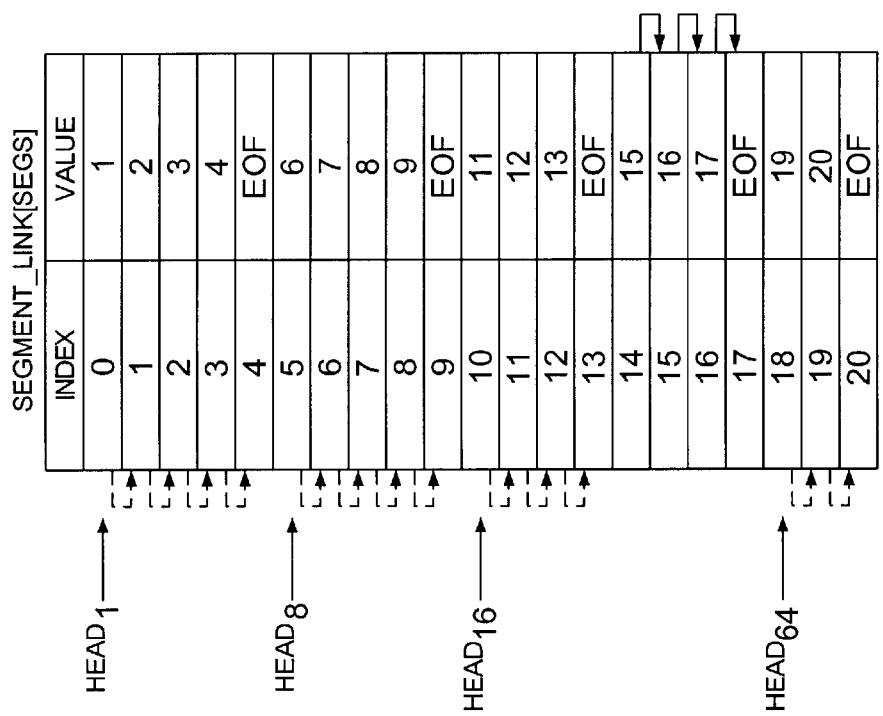
FIGS. 6A–6B illustrate how the SEGMENT_LINK and FREE_SEG_LIST data structures are updated after allocating 4 sixty-four-block cache segments for a read command.

FIGS. 6A–6B illustrate how the SEGMENT_LINK and FREE_SEG_LIST data structures are updated after allocating 4 sixty-four-block cache segments for a read command. Each new cache segment is allocated from the $HEAD_{64}$ pointer, and the $HEAD_{64}$ pointer is re-assigned to point to the cache segment specified in the VALUE field. The VALUE field of the last cache segment allocated (17 in this example) is assigned EOF to identify it as the end of the link. As shown in FIG. 6B, after allocating the 4 sixty-four-block cache segments the $HEAD_T$-pointer (corresponding to INDEX 6 in the FREE_SEG_LIST) points to cache segment 18, and the COUNT field is decremented by 4.

FIGS. 7A–7B illustrate how the SEGMENT_LINK and FREE_SEG_LIST data structures are updated after allocating 1 sixty-four-block cache segment, 1 eight-block cache segment, and 1 one-block cache segment for a write command. The sixty-four-block cache segment is allocated from the $HEAD_{64}$, pointer, and the $HEAD_{64}$ pointer is re-assigned to its VALUE field (i.e., to cache segment 19). The VALUE field for the cache segment 18 is assigned to the $HEAD_8$ pointer (i.e., cache segment 5), and the $HEAD_8$ pointer is re-assigned to its VALUE field (i.e., to cache segment 6). The VALUE field for the cache segment 5 is assigned to the HEAD, pointer (i.e., cache segment 0), and the HEAD, pointer is re-assigned to its VALUE field (i.e., to cache segment 1). The VALUE field for the cache segment 0 is assigned EOF since it identifies the end of the link. The COUNT fields in the 0, 3 and 6 entries of the FREE_SEG_LIST are decremented by one.

Figures 8A, 8B:
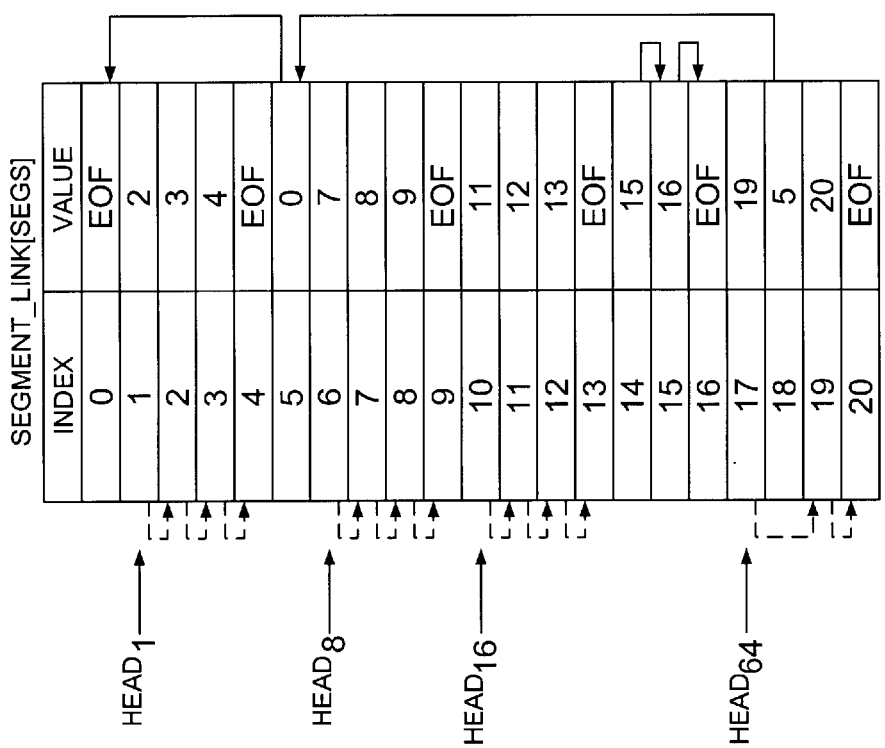
FIGS. 8A–8B illustrate how the SEGMENT_LINK and FREE_SEG_LIST data structures are updated after de-allocating 1 of the sixty-four-block cache segments for the read command of FIG. 6A.

FIGS. 8A–8B illustrate how the SEGMENT_LINK and FREE_SEG_LIST data structures are updated after de-allocating 1 of the sixty-four-block cache segments for the read command of FIG. 6A. In this embodiment, the last cache segment of the link (cache segment 17) is de-allocated first. The VALUE field of the de-allocated cache segment is assigned to the $HEAD_T$-pointer (i.e., to cache segment 19), and the $HEAD_T$-pointer is re-assigned to the de-allocated cache segment (i.e., to cache segment 17). The COUNT field in the 6 entry of the FREE_SEG_LIST is incremented by one.

Figures 9A, 9B:
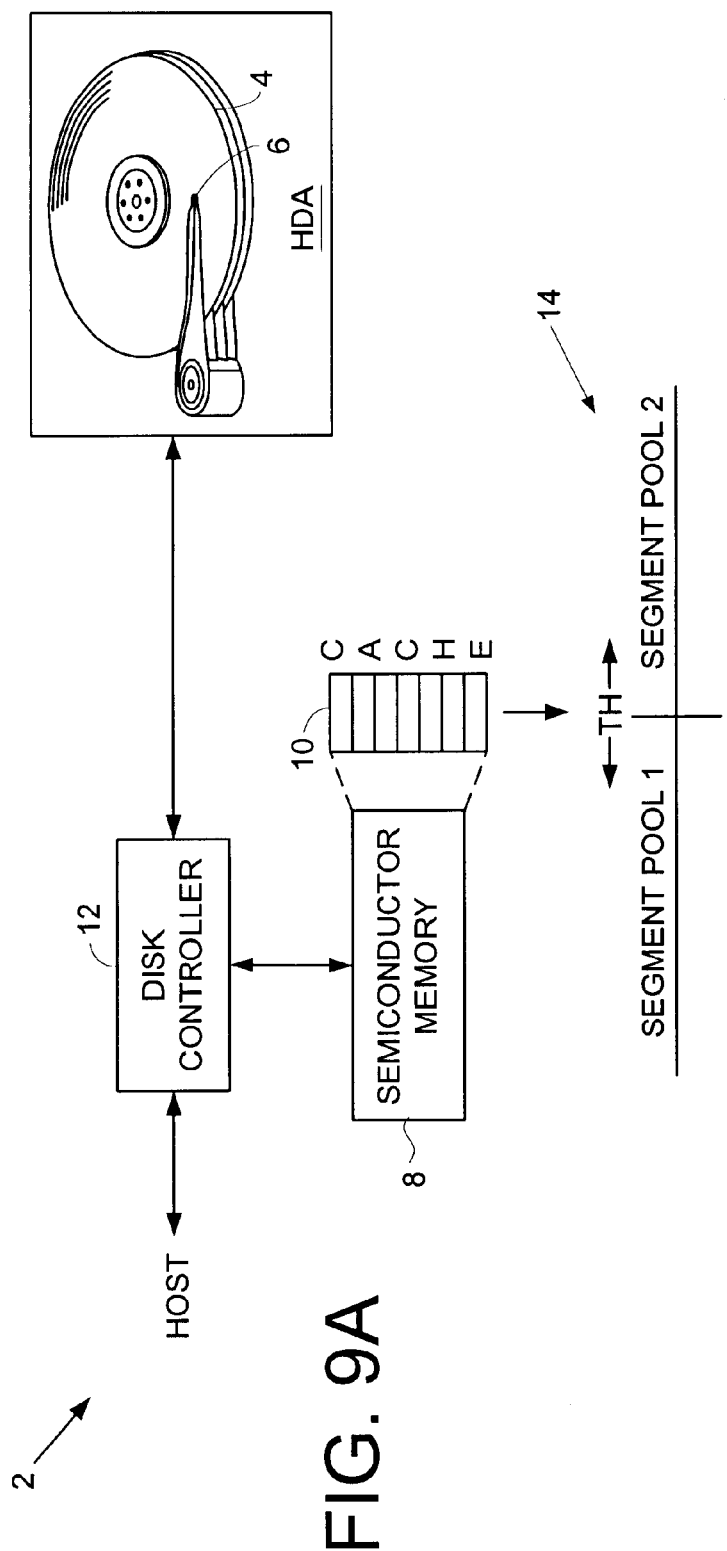
FIGS. 9A–9B show an embodiment of the present invention wherein the threshold is adjusted relative to an allocation status of each cache segment in the segment pools.

FIGS. 9A–9B show an embodiment of the present invention wherein the threshold TH is adjusted relative to an allocation status of each cache segment in the segment pools. For example, the threshold is reduced if the number of free cache segments in the first segment pool falls below a predetermined level. Reducing the threshold leads to more of the cache segments in the second segment pool being allocated so that cache segments in the first segment pool are preserved.

I claim:

1. A disk drive comprising:
   (a) a disk comprising a plurality of tracks, each track comprising a plurality of blocks;
   (b) a head actuated radially over the disk;
   (c) a semiconductor memory comprising a cache buffer for caching data written to the disk and data read from the disk, the cache buffer comprising a plurality of segment pools, each segment pool comprising a plurality of cache segments, each cache segment comprises at least one block, and the number of blocks in each cache segment varies between segment pools, wherein:
   a threshold is associated with a first one of the segment pools and a second one of the segment pools; and
   the threshold is greater than a size of the cache segments in the first segment pool and less than a size of the cache segments in the second segment pool; and
   (d) a disk controller for:
   receiving a host command from a host computer, the host command comprising a command size indicating a number of blocks associated with the host command; and
   comparing a factor of the command size to the threshold in order to allocate a cache segment from either the first segment pool or the second segment pool.

2. The disk drive as recited in claim 1, wherein the disk controller allocates a cache segment from the second segment pool if the factor of the command size is greater than the threshold.

3. The disk drive as recited in claim 2, wherein the disk controller allocates a plurality of cache segments from the first segment pool if the second segment pool is empty.

4. The disk drive as recited in claim 1, wherein the disk controller allocates a cache segment from the first segment pool if the factor of the block size is less than the threshold.

5. The disk drive as recited in claim 4, wherein the disk controller allocates a cache segment from the second segment pool if the first segment pool is empty.

6. The disk drive as recited in claim 1, wherein the each cache segment comprises $2^k$ number of blocks where k is a predetermined integer for each segment pool.

7. The disk drive as recited in claim 6, wherein:
(a) the segment pools comprise a one-block segment pool, an eight-block segment pool, a sixteen-block segment pool, and a sixty-four-block segment pool;
(b) the disk controller compares a first factor of the command size to a first threshold in order to allocate a cache segment from the one-block segment pool or the eight-block segment pool;
(c) the disk controller compares a second factor of the command size to a second threshold in order to allocate a cache segment from the eight-block segment pool or the sixteen-block segment pool; and
(d) the disk controller compares a third factor of the command size to a third threshold in order to allocate a cache segment from the sixteen-block segment pool or the sixtyfour-block segment pool.

8. The disk drive as recited in claim 7, wherein the first threshold is four, the second threshold is ten, and the third threshold is sixty-three.

9. The disk drive as recited in claim 1, wherein the disk controller adjusts the threshold relative to an allocation status of each cache segment in the segment pools.

10. A method of writing data through a head actuated radially over a disk in a disk drive, the disk comprising a plurality of tracks, each track comprising a plurality of blocks, the disk drive comprising a semiconductor memory comprising a cache buffer for caching data written to the disk and data read from the disk, the cache buffer comprising a plurality of segment pools, each segment pool comprising a plurality of cache segments, each cache segment comprises at least one block, and the number of blocks in each cache segment varies between segment pools, wherein a threshold is associated with a first one of the segment pools and a second one of the segment pools, the threshold is greater than a size of the cache segments in the first segment pool and less than a size of the cache segments in the second segment pool, the method comprising the steps of:
(a) receiving a host command from a host computer, the host command comprising a command size indicating a number of blocks associated with the host command; and
(b) comparing a factor of the command size to the threshold in order to allocate a cache segment from either the first segment pool or the second segment pool.

11. The method of writing data as recited in claim 10, wherein a cache segment is allocated from the second segment pool if the factor of the command size is greater than the threshold.

12. The method of writing data as recited in claim 11, further comprising the step of allocating a plurality of cache segments from the first segment pool if the second segment pool is empty.

13. The method of writing data as recited in claim 10, wherein a cache segment is allocated from the first segment pool if the factor of the block size is less than the threshold.

14. The method of writing data as recited in claim 13, further comprising the step of allocating a cache segment from the second segment pool if the first segment pool is empty.

15. The method of writing data as recited in claim 10, wherein the each cache segment comprises $2^k$ number of blocks where k is a predetermined integer for each segment pool.

16. The method of writing data as recited in claim 15, wherein the segment pools comprise a one-block segment pool, an eight-block segment pool, a sixteen-block segment pool, and a sixty-four-block segment pool, further comprising the steps of:
(a) comparing a first factor of the command size to a first threshold in order to allocate a cache segment from the one-block segment pool or the eight-block segment pool;
(b) comparing a second factor of the command size to a second threshold in order to allocate a cache segment from the eight-block segment pool or the sixteen-block segment pool; and
(c) comparing a third factor of the command size to a third threshold in order to allocate a cache segment from the sixteen-block segment pool or the sixty-four-block segment pool.

17. The method of writing data as recited in claim 16, wherein the first threshold is four, the second threshold is ten, and the third threshold is sixty-three.

18. The method of writing data as recited in claim 10, further comprising the step of adjusting the threshold relative to an allocation status of each cache segment in the segment pools.

* * * * *